US007776252B2

(12) United States Patent
Mihara et al.

(10) Patent No.: US 7,776,252 B2
(45) Date of Patent: Aug. 17, 2010

(54) METHOD FOR MANUFACTURING MULTILAYER CERAMIC ELECTRONIC COMPONENT

(75) Inventors: Kenjiro Mihara, Yokaichi (JP); Atsushi Kishimoto, Omihachiman (JP); Hideaki Niimi, Hikone (JP)

(73) Assignee: Murata Manufacturing Co., Ltd., Nagaokakyo-shi, Kyoto-fu (JP)

( * ) Notice: Subject to any disclaimer, the term of this patent is extended or adjusted under 35 U.S.C. 154(b) by 689 days.

(21) Appl. No.: 10/476,938

(22) PCT Filed: Feb. 13, 2003

(86) PCT No.: PCT/JP03/01461

§ 371 (c)(1),
(2), (4) Date: Nov. 6, 2003

(87) PCT Pub. No.: WO03/073443

PCT Pub. Date: Sep. 4, 2003

(65) Prior Publication Data

US 2004/0140595 A1 Jul. 22, 2004

(30) Foreign Application Priority Data

Feb. 28, 2002 (JP) ............................. 2002-053826
Jan. 16, 2003 (JP) ............................. 2003-007910

(51) Int. Cl.
*B28B 1/00* (2006.01)
*B28B 3/00* (2006.01)
*B28B 5/00* (2006.01)
*C04B 33/32* (2006.01)
*C04B 33/36* (2006.01)
*C04B 35/64* (2006.01)

(52) U.S. Cl. .................. 264/614; 156/89.12; 156/89.16

(58) Field of Classification Search ................. 264/614, 264/618, 603; 361/320, 321; 338/20, 22 R
See application file for complete search history.

(56) References Cited

U.S. PATENT DOCUMENTS 5,351,026 A * 9/1994 Kanbara et al. ........... 338/22 R
6,205,015 B1 * 3/2001 Wada et al. .............. 361/321.4
6,682,410 B2 * 1/2004 Fujishiro .................... 451/326

FOREIGN PATENT DOCUMENTS

JP 02-101724 4/1990
JP 02-101725 4/1990
JP 04-300159 10/1992
JP 04337601 A * 11/1992
JP 05-275273 A 10/1993
JP 05-283207 10/1993

(Continued)

*Primary Examiner*—Philip C Tucker
*Assistant Examiner*—Phu H Nguyen
(74) *Attorney, Agent, or Firm*—Dickstein, Shapiro, LLP.

(57) ABSTRACT

A multilayer thermistor with a positive temperature coefficient is manufactured by step 41 of forming a green laminate having thermistor green layers and internal electrode layers, step 42 of heat-treating this laminate at a temperature in the range of from 80 to less than 300° C., step 43 of performing dry-barrel polishing for the heat-treated green laminate, step 44 of forming external electrode films on respective end surfaces of this laminate, and step 45 of firing this laminate together with the individual electrode films. According to this method, a highly reliable multilayer thermistor with a positive temperature coefficient can be stably manufactured.

18 Claims, 5 Drawing Sheets

FOREIGN PATENT DOCUMENTS

| | | | | |
|---|---|---|---|---|
| JP | 05-308003 | | | 11/1993 |
| JP | 08-069943 | | | 3/1996 |
| JP | 08069943 | A | * | 3/1996 |
| JP | 2001-044066 | | | 2/2001 |
| JP | 2001044066 | A | * | 2/2001 |
| JP | 2001-217138 | | | 8/2001 |
| WO | WO 03/073443 | A1 | | 9/2003 |

* cited by examiner

METHOD FOR MANUFACTURING MULTILAYER CERAMIC ELECTRONIC COMPONENT

TECHNICAL FIELD

The present invention relates to methods for manufacturing multilayer ceramic electronic elements, and more particularly, relates to improvement of a multilayer ceramic electronic element, such as a multilayer thermistor with a positive temperature coefficient, having high reliability so that the manufacturing thereof can be surely performed.

BACKGROUND ART

As a multilayer ceramic electronic element, which is of interest to the present invention, for example, a multilayer thermistor with a positive temperature coefficient may be mentioned. The multilayer thermistor with a positive temperature coefficient has the following structure.

First, the multilayer thermistor with a positive temperature coefficient comprises a laminate used as an element body. The laminate comprises a plurality of thermistor layers having a positive temperature coefficient laminated to each other, and a plurality of internal electrodes formed along specific interfaces between the thermistor layers. The internal electrodes are disposed in the lamination direction so as to extend alternately to one end surface and the other end surface of the laminate.

In addition, the multilayer thermistor with a positive temperature coefficient also comprises external electrodes functioning as terminals on the respective end surfaces of the laminate described above. The external electrodes are electrically connected to the internal electrodes at the respective end surfaces of the laminate.

The multilayer thermistor with a positive temperature coefficient described above is manufactured, for example, by a manufacturing process shown in FIG. 3, as disclosed in Japanese Unexamined Patent Application Publication No. 5-308003.

As shown in FIG. 3, first, step 1, forming a green laminate, is performed. The green laminate obtained in this step is to be formed into the sintered laminate described above by firing and comprises thermistor green layers to be formed into the thermistor layers and conductive paste layers to be formed into the internal electrodes.

In general, the green laminates are formed by the steps of forming thermistor green sheets which are to be formed into thermistor green layers, cutting the thermistor green sheets so as to have predetermined dimensions, printing a conductive paste on the thermistor green sheets in order to form conductive paste layers which are to be formed into the internal electrodes, then laminating the thermistor green sheets to each other, followed by pressing to form a green mother laminate, and cutting this green mother laminate so as to form green laminates having predetermined dimensions.

The conductive paste layers for the internal electrodes described above are formed by using a conductive paste containing nickel as a conductive component, which is an inexpensive base metal and which can have an ohmic contact with the thermistor layer.

Next, step 2, firing the green laminate, is performed. When a base metal such as nickel is used as the conductive component of the internal electrode as described above, this firing step 2 is performed in a reducing atmosphere in order to prevent the base metal from being oxidized. Hence, in this case, after firing step 2, heat treatment (reoxidation) is performed in an oxidizing atmosphere so that the thermistor layers are able to have positive temperature coefficient properties. By this firing step 2, the sintered laminate can be obtained.

Next, wet-barrel step 3 is performed. This wet-barrel step 3 is generally performed in a manufacturing process not only for a multilayer thermistor with a positive temperature coefficient but also for a chip-type ceramic electronic element. In this step, the ceramic element bodies after firing (that is, the sintered bodies) are mixed and stirred with a polishing medium such as powdered alumina and water for barrel polishing (wet barrel) in order to prevent cracking, so-called chipping, of ceramic element bodies. As a result, the corners and ridgelines of the sintered ceramic element bodies, in other words, the laminates, can be rounded.

Next, step 4, applying an external electrode paste, is performed. That is, a conductive paste for forming the external electrodes is applied onto the respective end surfaces of the sintered laminate, and conductive paste films are formed thereby. In this step, a conductive component of the external electrode preferably contains the same metal as that of the conductive component of the internal electrode in order to obtain good electrical conduction state with the internal electrode. Hence, as described above, when the internal electrode contains nickel, a material containing nickel is preferably used for the conductive paste for this external electrode.

Next, step 5, firing the external electrodes, is performed. In this step, this firing step 5 is performed in a reducing atmosphere, when the conductive paste film for the external electrode contains a base metal such as nickel.

Through the steps described above, the multilayer thermistor with a positive temperature coefficient is obtained.

However, in the manufacturing process shown in FIG. 3, the following problems may arise in some cases.

Step 4 of applying the external electrode paste is performed after firing step 2. In addition, the internal electrodes in the sintered laminate obtained through firing step 2 may withdraw by contraction from the end surfaces of the laminate to the inside thereof in some cases, and as a result, they may not extend to the end surfaces. Hence, in step 4 of applying the external electrode paste, the conductive paste films may not be appropriately connected to the internal electrodes when being formed for the external electrodes in some cases.

In addition, when a base metal such as nickel is used as the conductive component of the internal electrode and as the conductive component of the external electrode, as described above, firing step 2 must be performed in a reducing atmosphere, and in addition, step 5 of firing the external electrodes must also be performed in a reducing atmosphere. Compared to the case in which an oxidizing atmosphere is obtained, the cost therefor is very high when a reducing atmosphere is obtained. Hence, when a reducing atmosphere is necessary in both steps 2 and 5, the cost of mass production is increased.

As a method capable of solving the problem described above, a manufacturing method shown in FIG. 4 may be mentioned.

As shown in FIG. 4, first, step 11 of manufacturing a green laminate is performed. This step 11 of manufacturing the green laminate is performed in a manner substantially equivalent to that of step 1 of manufacturing the green laminate shown in FIG. 3.

Next, step 12 of applying an external electrode paste is performed. This step 12 of applying the external electrode paste is substantially equivalent to step 4 of applying the external electrode paste shown in FIG. 3 except that the step is performed on the green laminate. However, since the conductive paste layers for the internal electrodes provided in the green laminate are not yet contracted by firing, appropriate connection states between the internal electrodes and the external electrodes can be achieved.

Next, firing step 13 is performed. In this firing step, the green laminate is fired together with the conductive paste films for the external electrodes. When the conductive paste layers for the internal electrodes and the conductive paste films for the external electrodes contain a base metal such as nickel, firing step 13 is performed in a reducing atmosphere, and subsequently, the fired laminate is heat-treated in an oxidizing atmosphere. As described above, since the conductive paste films for the external electrodes and the green laminate are simultaneously fired in firing step 13, the control for obtaining the reducing atmosphere is only necessary in this firing step 13; hence, compared to the manufacturing method shown in FIG. 3, the cost can be reduced.

Next, wet-barrel step 14 is performed. This wet-barrel step 14 is performed in a manner substantially equivalent to that of wet-barrel step 3 shown in FIG. 3, and by wet-barrel polishing, the corners and ridgelines of the sintered laminate are rounded for chipping prevention.

However, there are still problems which have to be solved in the manufacturing method shown in FIG. 4.

That is, since wet-barrel step 14 is performed for the sintered laminate provided with the external electrodes, parts of the external electrodes are polished by barrel polishing, and as a result, the conductions between the external electrodes and the internal electrodes may become unstable in some cases.

In addition, since wet-barrel steps 3 and 14 are performed after firing steps 2 and 13 in both manufacturing methods shown in FIGS. 3 and 4, the barrel polishing is performed on the sintered laminate. Hence, a problem may arise in that cracking or the like is liable to occur in the sintered laminate, because of the barrel polishing.

In addition to the case in which the multilayer thermistor with a positive temperature coefficient described above is manufactured, the same problem as described above may also arise when other multilayer ceramic electronic elements are manufactured each having a structure similar to that of the multilayer thermistor with a positive temperature coefficient.

DISCLOSURE OF INVENTION

Accordingly, an object of the present invention is to provide a method for manufacturing a multilayer ceramic electronic element, the method capable of solving the various problems described above.

That is, the present invention relates to a method for manufacturing a multilayer ceramic electronic element including: a laminate which has ceramic layers laminated to each other and internal electrodes formed along specific interfaces between the ceramic layers, the internal electrodes being disposed in the lamination direction so as to extend alternately to one end surface and the other end surface of the laminate; and external electrodes formed on the respective end surfaces so as to be electrically connected to one of the internal electrodes. In order to solve the technical problems described above, the method described above comprises the following steps.

That is, according to the method of the present invention for manufacturing a multilayer ceramic electronic element, a step of forming a green laminate is first performed, in which the green laminate is to be formed into the laminate described above by firing and which has ceramic green layers for forming the ceramic layers and conductive paste layers for forming the internal electrodes.

Next, the green laminate described above is heat-treated. This heat treatment is performed in order to prevent an undesired reaction between wastes of the polishing medium generated in subsequent barrel polishing and the surface of the green laminate.

Next, the barrel polishing is performed for this heat-treated green laminate in order to prevent chipping. In this step, as the barrel polishing, dry-barrel polishing is used.

Next, the heat-treated green laminate is fired.

Through the steps described above, the multilayer ceramic electronic element is manufactured.

In this method for manufacturing the multilayer ceramic electronic element, the external electrodes may be formed by forming conductive paste films on the respective end surfaces of the fired laminate, followed by firing of the conductive paste films; however, the external electrodes are preferably formed by the steps of, forming conductive paste films, which are to be formed into the external electrodes, on the respective end surfaces of the green laminate after the dry-barrel polishing described above is performed, and firing these conductive paste films together with the green laminate in a firing step thereof.

The step of heat-treating the green laminate, described above, is preferably performed at a temperature in the range of from 80 to less than 300° C., and more preferably in the range of from 80 to 200° C.

In addition, when the internal electrodes contain a base metal as a conductive component, the step of firing the green laminate is preferably performed in a reducing atmosphere.

When the multilayer ceramic electronic element to be manufactured is a multilayer thermistor with a positive temperature coefficient, the ceramic layers are thermistor layers having a positive temperature coefficient, and in order to obtain the positive temperature coefficient, a step of heat treatment (reoxidation) of the fired laminate is preferably performed in an oxidizing atmosphere. This method is also effective when the external electrodes contain a base metal as a conductive component.

In the embodiment described above, when a step of forming a glass coat on an exposed part of the external surface of the fired laminate through heat treatment is further performed, the exposed part being a part which is not covered with the external electrodes, it is preferable that the step of heat-treating the fired laminate in an oxidizing atmosphere also function as the step of forming a glass coat.

In addition, the internal electrodes and the external electrodes preferably contain the same metal, such as nickel, as a conductive component.

BEST MODE FOR CARRYING OUT THE INVENTION

Hereinafter, a multilayer thermistor with a positive temperature coefficient will be described as an example of a multilayer ceramic electronic element.

Figure 1:
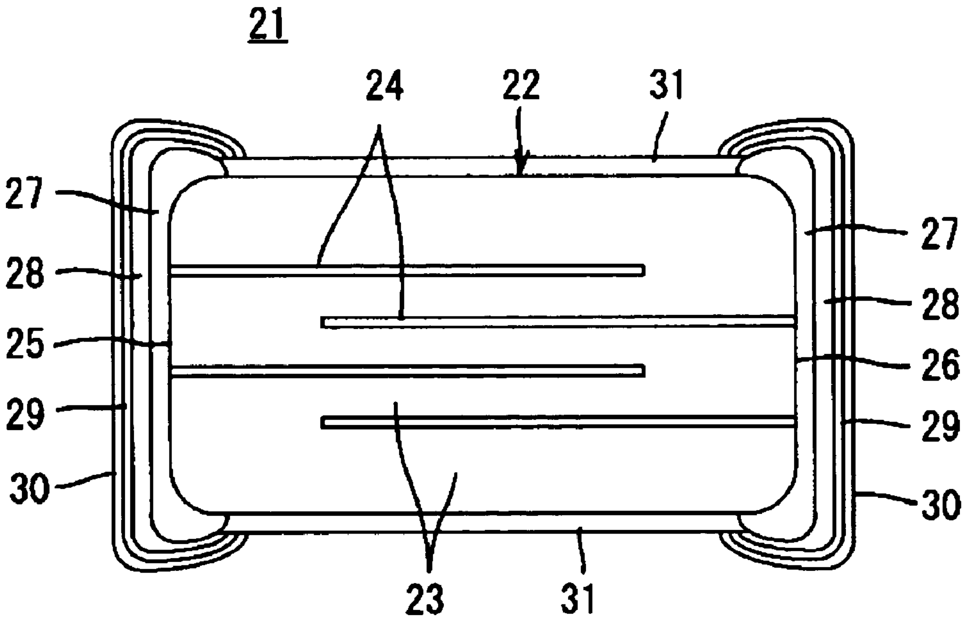
FIG. 1 is a cross-sectional view schematically showing a multilayer thermistor 21 with a positive temperature coefficient manufactured by a manufacturing method of one embodiment of the present invention.

FIG. 1 is a cross-sectional view schematically showing a multilayer thermistor 21 with a positive temperature coefficient formed by a manufacturing method of one embodiment according to the present invention.

The multilayer thermistor 21 with a positive temperature coefficient includes a laminate 22 functioning as a chip element body. The laminate 22 has a plurality of thermistor layers 23 having a positive temperature coefficient, which serve as ceramic layers and are laminated to each other, and a plurality of internal electrodes 24 formed along specific interfaces between the thermistor layers 23. The internal electrodes 24 are located at the middle portion of the laminate 22 in the lamination direction, and hence the thermistor layers 23 located at the external portions of the laminate 22 are used as protection layers.

The internal electrodes 24 are composed of first internal electrodes extending to one end surface 25 of the laminate 22 and second internal electrodes extending to the other end surface 26 thereof, which are disposed alternately in the lamination direction. The internal electrodes 24 may be hollow electrodes whenever necessary.

On the respective end surfaces 25 and 26 of the laminate 22, external electrodes 27 used as terminals are formed. The external electrodes 27 are each electrically connected to one of the internal electrodes 24. That is, the external electrode 27 at the left side in the figure is electrically connected to the first internal electrodes, and the external electrode 27 at the right side in the figure is electrically connected to the second internal electrodes.

As a conductive component contained in the internal electrode 24, for example, nickel which is an inexpensive base metal and which may have ohmic properties, is preferably used. The external electrode 27 preferably contains the same metal as that contained in the internal electrode 24 as a conductive component and, for example, contains nickel.

Whenever necessary, a fired layer 28 obtained by firing a conductive paste containing silver or the like on each of the external electrodes 27 is formed. In addition, on each of the fired layer, a nickel plating layer 29 is formed, and a tin or solder plating layer 30 is further formed thereon.

In addition, a glass coat 31 is preferably formed so as to cover an exposed part of the external surface of the laminate 22 not covered with the external electrodes 27 (that is, a part of the surface other than that provided with the external electrodes 27 of the laminate 22).

Figure 2:
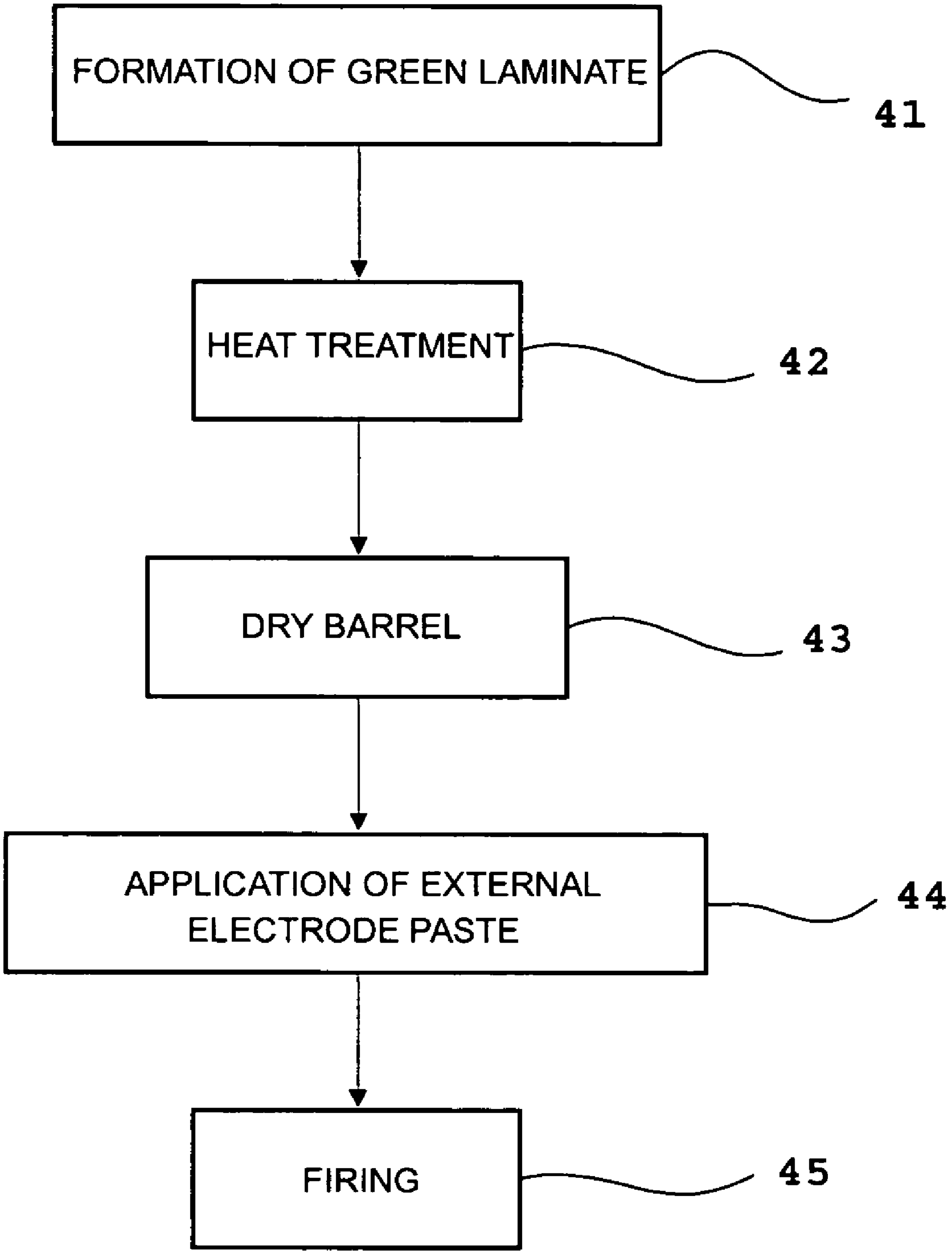
FIG. 2 is a manufacturing chart for illustrating one embodiment of a method of the present invention for manufacturing a multilayer thermistor with a positive temperature coefficient.

FIG. 2 shows a typical process included in a manufacturing method of the multilayer thermistor 21 with a positive temperature coefficient shown in FIG. 1.

Figure 3:
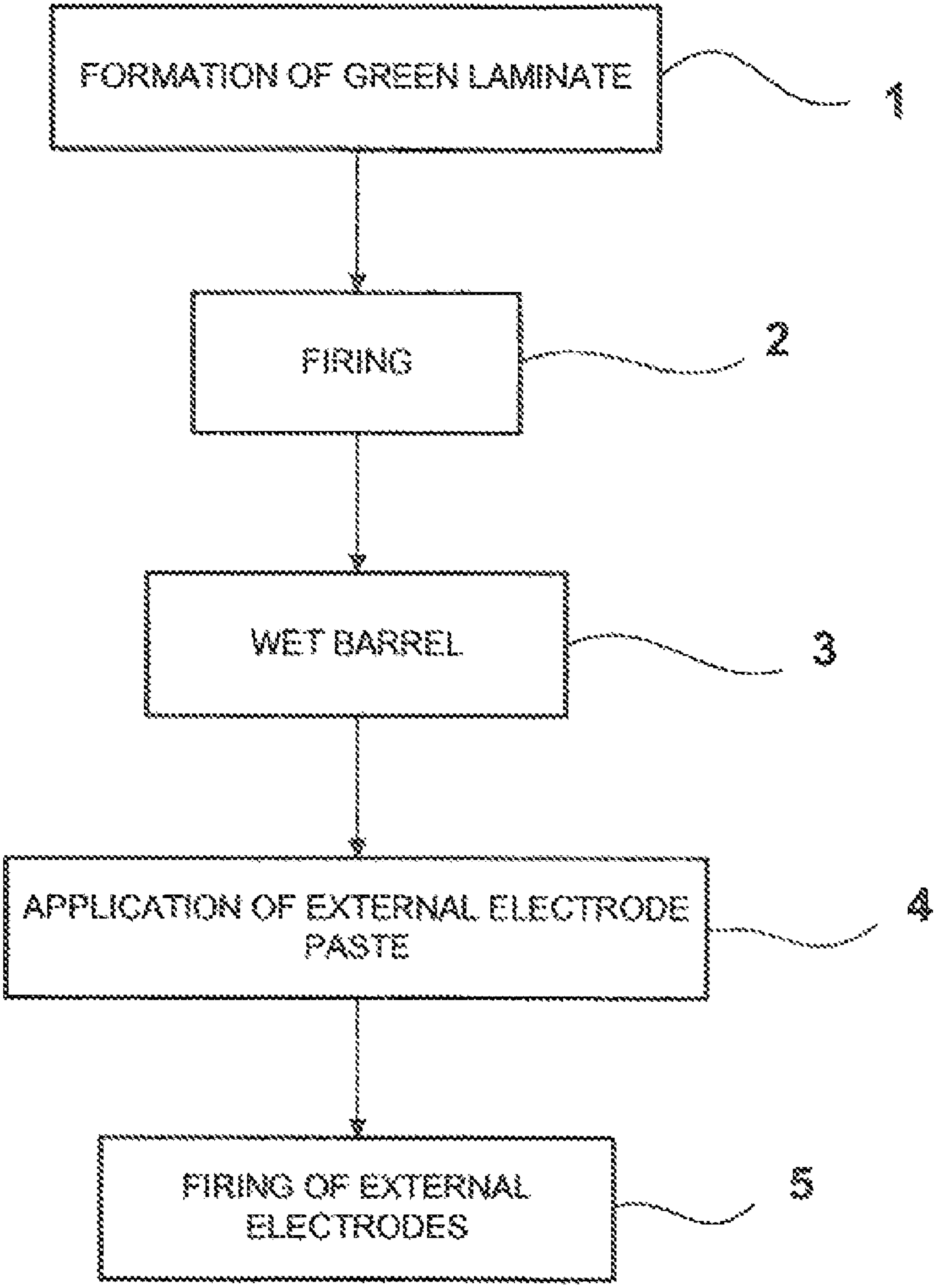
FIG. 3 PRIOR ART
FIG. 3 is a manufacturing chart for illustrating a conventional method for manufacturing a multilayer thermistor with a positive temperature coefficient, which method is of interest to the present invention.

As shown in FIG. 2, first, step 41 of forming a green laminate is performed. This step 41 of forming the green laminate is substantially the same as steps 1 and 11 of forming the green laminate shown in FIGS. 3 and 4. The green laminate formed in this step 41 is formed into the laminate 22 shown in FIG. 1 by firing and has thermistor green layers as the ceramic green layers for the thermistor layers 23 and conductive paste layers for the internal electrodes 24.

When the green laminates are formed, a process is generally performed which comprises the steps of forming thermistor green sheets as ceramic green sheets to be formed into thermistor green layers; cutting the thermistor green sheets so as to have predetermined dimensions; then forming conductive paste layers by printing a conductive paste on the thermistor green sheets for the internal electrodes 24; then laminating a plurality of thermistor green sheets to each other, in which said plurality of thermistor green sheets includes the thermistor green sheets provided with the internal electrodes 24 by printing; pressing the laminate to form a green mother laminate; and cutting this mother laminate so as to have predetermined dimensions. Accordingly the green laminates are formed.

Next, heat treatment step 42 is performed for the green laminate. This heat treatment step 42 is performed in order to prevent reaction between the surface of the green laminate and wastes of a polishing medium generated in subsequent dry-barrel step 43.

In heat treatment step 42, the temperature is preferably in the range of from 80 to less than 300° C. The reason the temperature is set to 80° C. or more is that when the temperature is less than 80° C., the effect of heat treatment may not be sufficiently obtained in some cases. On the other hand, the reason the temperature is set to less than 300° C. is that when the temperature is 300° C. or more, the binder contained in the green laminate may begin to escape therefrom in some cases. In addition, the temperature in this heat treatment step 42 is more preferably set to 80 to 200° C.

Next, dry-barrel step 43 is performed. In this dry-barrel step 43, the green laminates are mixed with a polishing medium composed of silica, alumina, or a mixture thereof, and in a dry state, barrel polishing is performed. By this step, the corners and ridgelines of the green laminates are rounded for chipping prevention. In addition, the rounded corner and ridgelines portions are formed by this dry barrel polishing in the laminate 22 shown in FIG. 1.

Next, step 44 of applying an external electrode paste is performed. In this step 44 of applying the external electrode paste, a conductive paste for the external electrodes 27 is applied onto the respective end surfaces of the green laminate, and hence conductive paste films are formed. In this step, the conductive paste films for the external electrodes can be reliably connected to the conductive paste layers for the internal electrodes which extend to the end surfaces of the green laminate since the laminate is at the stage before firing, and the conductive paste layers for the internal electrodes formed inside is not contracted by firing.

Next, firing step 45 is performed. In this firing step 45, the green laminate is fired together with the conductive paste films for the external electrodes 27. That is, the green laminate is formed into a dense ceramic laminate, and the conductive paste films for the external electrodes and the internal electrodes are formed into dense electrode films. In this step, when the conductive paste layers for the internal electrodes 24 and the conductive paste films for the external electrodes 27 contain a base metal such as nickel as a conductive component, this firing step 45 is performed in a reducing atmosphere (non-oxidizing atmosphere).

As described above, the sintered laminate 22 shown in FIG. 1 is obtained. In addition, the fired external electrodes 27 are formed on the end surfaces 25 and 26.

When the internal electrodes 24 and the external electrodes 27 contain the same metal, for example, contain nickel as a conductive component in common, superior conduction states can be formed between the internal electrodes 24 and the external electrodes 27.

Next, although not shown in FIG. 2, a step of forming a glass coat 31 is performed. The glass coat 31 is formed by applying a glass material in the form of a glass paste or the like onto a predetermined position, followed by heat treatment, so as to cover an exposed part, which is not covered with the external electrodes 27, of the external surface of the sintered laminate 22.

When the conductive paste layers for the internal electrodes 24 and the conductive paste films for the external electrodes 27 contain a base metal, the laminate 22 must be heat-treated (reoxidation) in an oxidizing atmosphere since firing step 45 is performed in a reducing atmosphere, in order to obtain positive temperature coefficient properties of the thermistor layers 23. Since the step of forming the glass coat 31 includes heat treatment, and this heat treatment is performed in an oxidizing atmosphere, the reoxidation step is more effectively performed so that the step of forming the glass coat 31 is also performed.

Next, on each of the external electrodes 27, the fired layer 28 is formed by firing a conductive paste containing silver or the like, and subsequently, the nickel plating film 29 and the tin or solder plating film 30 are sequentially formed, thereby forming the multilayer thermistor 21 with a positive temperature coefficient shown in FIG. 1.

Heretofore, the present invention has been described for the manufacturing method of a multilayer thermistor with a positive temperature coefficient; however, the present invention can also be applied to manufacturing methods of other multilayer ceramic electronic elements such as a multilayer ceramic capacitor, a multilayer ceramic inductor, a multilayer ceramic varistor, and a multilayer thermistor with a negative temperature coefficient.

In addition, when ceramic layers used for a multilayer ceramic electronic element are formed, for example, of a dielectric ceramic or a magnetic ceramic, even when the step of firing the green laminate is performed in a reducing atmosphere, in general, heat treatment in an oxidizing atmosphere for reoxidation may not be necessary.

As described above, since the dry barrel polishing is performed for the green laminate before the conductive paste films are formed for the external electrodes according to the present invention, the problem of unstable conduction caused by polishing of the external electrodes can be solved, the chipping problem can be solved, and in addition, a problem in that cracking is generated when the barrel polishing is performed on the sintered laminate can also be solved.

In addition, the reaction between the wastes of the polishing medium generated in the barrel polishing and the surface of the green laminate can be prevented since the green laminate is heat-treated before the dry-barrel polishing is performed, and hence stable properties can be obtained for a long period of time.

According to the present invention, as described above, a multilayer ceramic electronic element can be stably manufactured with high reliability. In particular, the present invention can be advantageously applied to a manufacturing method of a multilayer thermistor with a positive temperature coefficient.

In the present invention, the problem of the conduction defect between the external electrodes and the internal electrodes, which is caused by the contraction of the internal electrodes by firing, can be more effectively solved when the conductive paste films for the external electrodes are formed when the laminate is in a green state.

In addition, when the green laminate is heat-treated at a temperature of 80° C. or more in the present invention, the reaction described above, which occurs between the wastes of the polishing medium and the surface of the green laminate, can be more reliably prevented. In addition, when the temperature in this heat treatment is set to less than 300° C. and more preferably set to 200° C. or less, the binder contained in the green laminate can be prevented from escaping therefrom, and hence, the case in which the green laminate is damaged or destroyed can be reliably prevented in the subsequent dry-barrel polishing.

Next, examples, which were performed in order to define the scope of the present invention and also in order to confirm the effects of the present invention, will be described.

Example 1

First, powdered $BaCO_3$, $TiO_2$, and $Sm_2O_3$ used as starting materials were mixed together so as to have a composition represented by $(Ba_{0.9998}Sm_{0.0002})TiO_3$. Next, purified water was added to this powdered mixture, and the resultant mixture was then mixed and pulverized with zirconia balls, dried, and calcined at a temperature of 1,000° C. for 2 hours.

Next, an organic binder, a dispersing agent, and water were added to this calcined powder and were mixed together with zirconia balls for several hours, thereby forming a slurry. By forming this slurry into sheets, green sheets for thermistor layers were formed.

Next, after the green sheets for the thermistor layers were cut so as to have predetermined dimensions, a conductive paste containing nickel was printed on the green sheets for the thermistor layers, thereby forming conductive paste layers for the internal electrodes.

Next, the green sheets for the thermistor layers were laminated to each other so that the conductive paste layers for the internal electrodes oppose each other with the green sheets for the thermistor layers provided therebetween. On the top and the bottom of the resultant laminate, the green sheets for the thermistor layers used for protection were provided and were then pressed in the lamination direction, followed by cutting of the pressed laminate so as to have predetermined dimensions, thereby forming the green laminates.

Next, the green laminates were heat-treated at a temperature of 150° C. for one hour.

Next, a polishing medium having a diameter of 1 mm, which was composed of silica and alumina, was mixed with the green laminates thus heat-treated, and in that state, dry-barrel polishing was performed, thereby obtaining green laminates having rounded corner and ridgeline portions.

Next, a conductive paste containing nickel was applied onto two end surfaces of the green laminate, followed by drying, thereby forming conductive paste films for external electrodes. Subsequently, a firing step was performed at a temperature of 1,300° C. in a reducing atmosphere in which $H_2/N_2$=3%, and hence a sintered laminate provided with fired external electrodes was obtained.

Next, after a glass paste film was formed by applying a glass material so as to cover an exposed part of the sintered laminate, which is not covered with the external electrodes, heat treatment in an oxidizing atmosphere was performed, and hence reoxidation of the thermistor layers of the laminate was performed in addition to the formation of the glass coat.

Next, firing was performed at a temperature of 700° C. after a conductive paste containing silver was applied onto the external electrodes and was then dried, and a nickel plating film and a tin plating film were further formed, thereby obtaining a multilayer thermistor with a positive temperature coefficient as the example.

Figure 4:
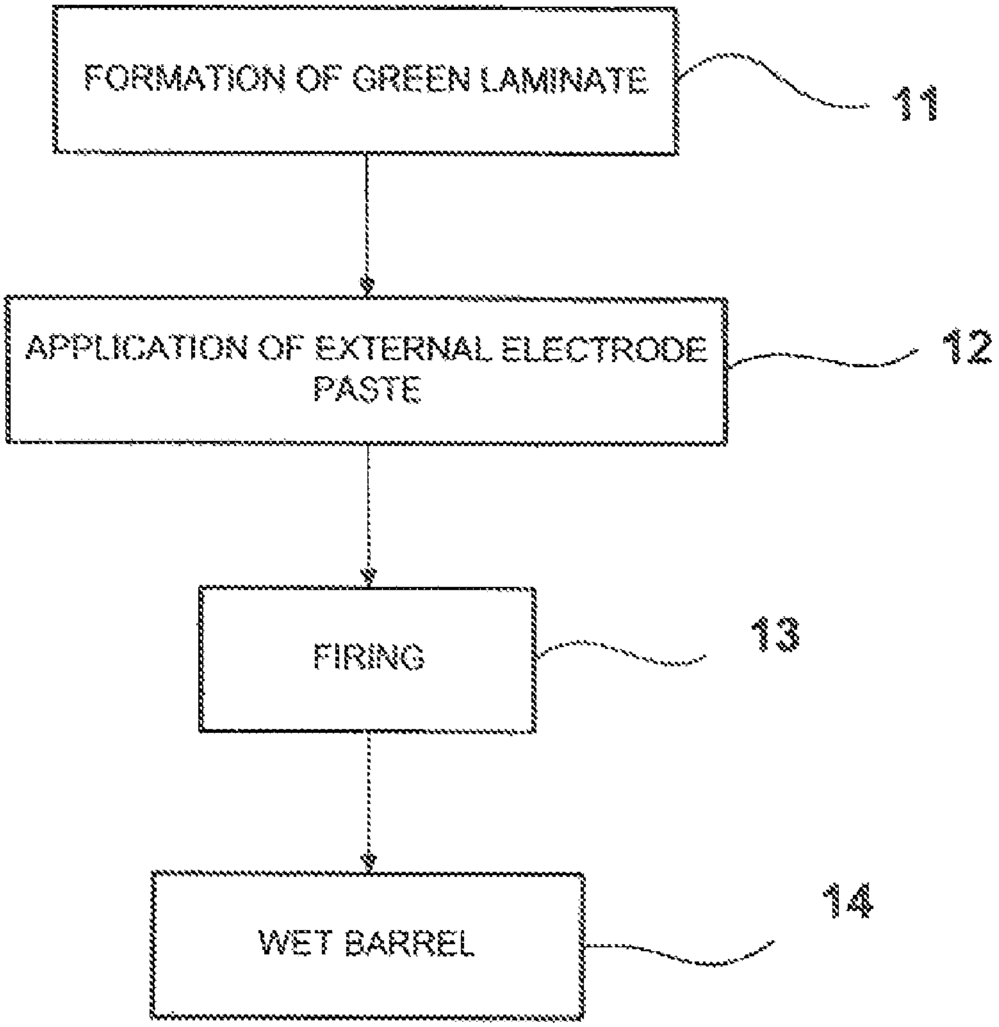
FIG. 4 PRIOR ART
FIG. 4 is a manufacturing chart for illustrating a method for manufacturing a multilayer thermistor with a positive temperature coefficient, which method is a background art of the present invention.

In addition, except for the use of the above manufacturing method shown in FIG. 4, a multilayer thermistor with a positive temperature coefficient was formed as a comparative example under the same conditions as those in the example.

In order to compare the example and the comparative example, the resistance was measure as the index of the unstableness of the conduction. In Table 1, the measurement results of the resistance obtained from 20 samples of each of the example and the comparative example are shown.

TABLE 1

| | Example (Ω) | Comparative Example (Ω) |
|---|---|---|
| Average Value | 0.199 | 3.095 |
| Maximum Value | 0.26 | 3.9 |
| Minimum Value | 0.17 | 2.4 |
| Standard Deviation | 0.022 | 0.336 |

From Table 1, it is understood that the average resistance of the comparative example was approximately 3Ω, the average resistance of the example was approximately 0.2Ω; the resistance of the comparative example was higher.

In addition, the distribution range of the resistance was fairly wide in the comparative example, and in the example, the distribution range thereof was very narrow as compared to that of the comparative example. From these results, it is understood that the conduction between the internal electrode and the external electrode was stable according to the example.

Example 2

Next, multilayer thermistors with a positive temperature coefficient were obtained from samples 1 to 12, which samples were formed without performing the heat treatment performed for the green laminate in forming the multilayer thermistor with a positive temperature coefficient as the example in example 1 described above or were formed by variously changing the temperature of the heat treatment described above.

TABLE 2

| Sample No. | Heat Treatment Temperature | Rate of Change in Resistance (Application Time at 6 V) 78 Hours | 121 Hours | 273 Hours | 496 Hours |
|---|---|---|---|---|---|
| 1 | No Heat Treatment | 5.7 | 7.9 | 11.4 | 15.3 |
| 2 | 40 | 5.2 | 8.1 | 12.3 | 16.1 |
| 3 | 60 | 2.7 | 3.1 | 8.5 | 12.2 |
| 4 | 80 | 0.9 | 1.3 | 2.2 | 2.4 |
| 5 | 100 | 0.3 | 0.6 | 1.3 | 1.7 |
| 6 | 125 | 0.4 | 0.7 | 1.1 | 1.6 |
| 7 | 150 | 0.2 | 0.5 | 0.9 | 1.8 |
| 8 | 200 | 0.4 | 0.6 | 1.4 | 1.7 |
| 9 | 250 | 1.8 | 2.7 | 3.3 | 4.1 |
| 10 | 280 | 3.2 | 4.9 | 7.1 | 8.8 |
| 11 | 300 | 8.3 | 9.6 | 10.9 | 11.1 |
| 12 | 350 | Incapable of Being Fired | | | |

The initial resistances of five multilayer thermistors with a positive temperature coefficient of each of samples 1 to 12 were measured, and in addition, the resistances therefore were also measured at a voltage of 6 V after 78, 121, 273, and 496 hours from the start. From the measurement results of the resistance, the rates of change in resistance with time were obtained. The results are shown in Table 2 and FIG. 5.

Figure 5:
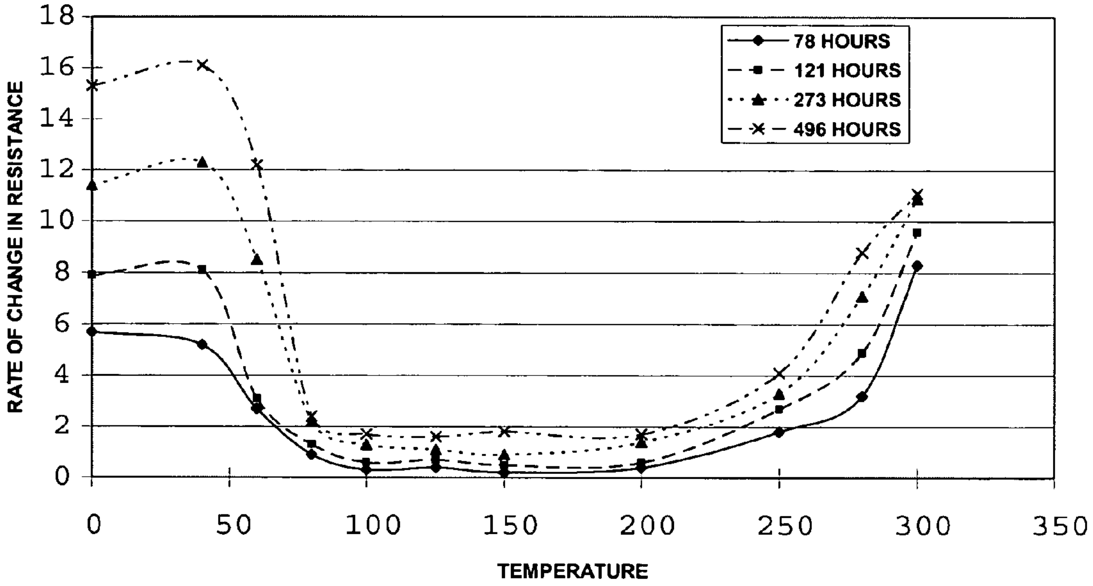
FIG. 5 is a graph showing the relationship between the rate of change in resistance and the temperature of heat-treating a green laminate according to an example of the present invention.

As can be seen from Table 2 and FIG. 5, the effect of decreasing the rate of change in resistance could be obtained by heat treatment at a temperature of 60° C. or more. However, the effect of decreasing the rate of change in resistance could be surely obtained when the heat treatment was performed at a temperature in the range of from 80 to less than 300° C.

That is, according to samples 4 to 10 in which the heat treatment was performed at a temperature in the range of from 80 to less than 300° C., the rate of change in resistance could be suppressed within 10% even after 496 hours from the start of the measurement. In particular, according to samples 4 to 8, in which the heat treatment was performed at a temperature in the range of from 80 to 200° C., each rate of change in resistance could be suppressed to within 5%.

On the other hand, according to sample 1 in which no heat treatment was performed and samples 2 and 3 in which the heat treatment was performed at a temperature of less than 80° C., a large rate of change in resistance was observed, and in particular, the rate of change in resistance was more than 10% after 496 hours from the start of the measurement. In samples 1 to 3, colored points were observed on the surface of the sintered laminate. These colored points were formed from polishing wastes of a polishing medium, which adhered to the surface of the green laminate in the dry-barrel polishing step and reacted therewith in firing in a reducing atmosphere. In addition, it is believed that, as described above, the reaction with the polishing wastes degraded the reliability of the multilayer thermistor having a positive temperature coefficient with time after a voltage was applied thereto.

On the other hand, according to samples 11 and 12 in which the heat treatment was performed at a temperature of 300° C. or more, the green laminate after heat treatment had a low strength and was damaged in the dry-barrel step; sample 11 had a high rate of change in resistance; and since the green laminate of sample 12 was destroyed in the dry-barrel step, the subsequent firing step could not be performed. The reason for this is believed that the binder contained in the green laminate escaped therefrom in the heat treatment step.

INDUSTRIAL APPLICABILITY

As has thus been described, a highly reliable multilayer ceramic electronic element such as multilayer thermistor with a positive temperature coefficient can be produced with high reproducibility according to the method of the present invention for manufacturing a multilayer ceramic electronic element since the conduction between the external electrodes and the internal electrodes is superior and defects such as cracking are not liable to occur.

The invention claimed is:

1. A method for manufacturing a multilayer ceramic electronic element including a laminate having ceramic layers laminated to each other and internal electrodes formed along interfaces between ceramic layers, the internal electrodes being disposed in the lamination direction so as to extend alternately to one end surface and another end surface of the laminate; and external electrodes formed on the respective end surfaces so as to be electrically connected to one of the internal electrodes; the method comprising:

providing a green laminate comprising ceramic green layers for forming the ceramic layers of the element and conductive paste layers for forming the internal electrodes;

pressing the green laminate;

heat-treating the pressed green laminate at a temperature insufficient to remove binder in the green laminate and in the range of 80° C. to less than 300° C.;

after said heat-treating, dry-barrel polishing the heat-treated green laminate; and firing the heat-treated dry-barrel polished green laminate.

2. The method for manufacturing a multilayer ceramic electronic element according to claim 1, wherein the conductive paste comprises a base metal as a conductive component, and the firing of the green laminate is performed in a reducing atmosphere.

3. The method for manufacturing a multilayer ceramic electronic element according to claim 2, wherein the base metal comprises nickel.

4. The method for manufacturing a multilayer ceramic electronic element, according to claim 1, wherein the multilayer ceramic electronic element comprises a multilayer thermistor with a positive temperature coefficient, the ceramic layers are thermistor layers having a positive temperature coefficient, and the method further comprises heat-treating the fired laminate in an oxidizing atmosphere.

5. The method for manufacturing a multilayer ceramic electronic element according to claim 4, further comprising forming said external electrodes.

6. The method for manufacturing a multilayer ceramic electronic element according to claim 5, further comprising providing glass on an exposed part of the external surface of the fired laminate through heat treatment, the exposed part being a part which is not covered with the external electrodes, whereby the heat-treating of the fired laminate in an oxidizing atmosphere also functions to form a glass coating.

7. The method for manufacturing a multilayer ceramic electronic element, according to claim 6, wherein the internal electrodes and the external electrodes contain the same metal as a conductive component.

8. The method for manufacturing a multilayer ceramic electronic element according to claim 7, wherein the base metal comprises nickel.

9. The method for manufacturing a multilayer ceramic electronic element according to claim 1, further comprising forming said external electrodes.

10. The method for manufacturing a multilayer ceramic electronic element according to claim 9, further comprising providing glass on an exposed part of the external surface of the fired laminate through heat treatment, the exposed part being a part which is not covered with the external electrodes, whereby the heat-treating of the fired laminate in an oxidizing atmosphere also functions to form a glass coating.

11. The method for manufacturing a multilayer ceramic electronic element according to claim 1, further comprising forming said external electrodes after the dry-barrel polishing of the heat-treated green laminate.

12. The method for manufacturing a multilayer ceramic electronic element according to claim 11, further comprising, forming conductive paste films for the external electrodes on the respective end surfaces of the green laminate after the dry-barrel polishing, whereby the step of firing the green laminate also functions to fire the conductive paste films for the external electrodes.

13. The method for manufacturing a multilayer ceramic electronic element according to claim 12, wherein the heat treating the green laminate is performed at a temperature in the range of from 80 to 200° C.

14. The method for manufacturing a multilayer ceramic electronic element according to claim 13, wherein the conductive paste comprises a base metal as a conductive component, and the firing of the green laminate is performed in a reducing atmosphere.

15. The method for manufacturing a multilayer ceramic electronic element, according to claim 14, wherein the multilayer ceramic electronic element comprises a multilayer thermistor with a positive temperature coefficient, the ceramic layers are thermistor layers having a positive temperature coefficient, and the method further comprises heat-treating the fired laminate in an oxidizing atmosphere.

16. The method for manufacturing a multilayer ceramic electronic element according to claim 15, further comprising providing glass on an exposed part of the external surface of the fired laminate through heat treatment, the exposed part being a part which is not covered with the external electrodes, whereby the heat-treating of the fired laminate in an oxidizing atmosphere also functions to form a glass coating on the exposed part.

17. The method for manufacturing a multilayer ceramic electronic element, according to claim 16, wherein the internal electrodes and the external electrodes contain the same base metal as a conductive component.

18. The method for manufacturing a multilayer ceramic electronic element according to claim 17, wherein the base metal comprises nickel.

* * * * *